(12) United States Patent
Nakagawa et al.

(10) Patent No.: US 8,355,326 B2
(45) Date of Patent: Jan. 15, 2013

(54) CPU CONNECTION CIRCUIT, DATA PROCESSING APPARATUS, ARITHMETIC PROCESSING DEVICE, PORTABLE COMMUNICATION TERMINAL USING THESE MODULES AND DATA TRANSFER METHOD

(75) Inventors: Takao Nakagawa, Tokyo (JP); Takashi Tachikawa, Tokyo (JP); Naoyuki Nakamura, Tokyo (JP); Tadashi Tsukamoto, Tokyo (JP); Toshikatsu Hosoi, Tokyo (JP); Hiroshi Kurakane, Tokyo (JP)

(73) Assignee: NEC Corporation, Tokyo (JP)

( * ) Notice: Subject to any disclaimer, the term of this patent is extended or adjusted under 35 U.S.C. 154(b) by 842 days.

(21) Appl. No.: 12/374,949

(22) PCT Filed: Jul. 25, 2007

(86) PCT No.: PCT/JP2007/064608
§ 371 (c)(1),
(2), (4) Date: Apr. 22, 2009

(87) PCT Pub. No.: WO2008/013209
PCT Pub. Date: Jan. 31, 2008

(65) Prior Publication Data
US 2011/0249560 A1    Oct. 13, 2011

(30) Foreign Application Priority Data
Jul. 28, 2006   (JP) .................................. 2006-206808

(51) Int. Cl.
*H04L 12/54*    (2006.01)
(52) U.S. Cl. ......... 370/230; 370/252; 370/412; 370/429
(58) Field of Classification Search .......... 370/229–235, 370/252, 253, 412–418, 428, 429
See application file for complete search history.

(56) References Cited

U.S. PATENT DOCUMENTS

| 5,163,132 A | 11/1992 | DuLac et al. |
| 5,396,597 A | 3/1995 | Bodin et al. |
| 5,664,122 A | 9/1997 | Rabe et al. |

(Continued)

FOREIGN PATENT DOCUMENTS
JP    1985156159 A    8/1985
(Continued)

OTHER PUBLICATIONS

Int'l Search Report in this application PCT/JP2007/064608, Oct. 23, 2007, NEC Corporation.

(Continued)

*Primary Examiner* — Pao Sinkantarakorn

(57) ABSTRACT

There are provided a CPU connection circuit and a method wherein the CPU connection circuit is a circuit to be employed by two CPUs by alternately conducting a changeover between two buffers disposed therebetween to prevent an event that data processing cannot be fully executed by the CPU on the receiving side. There is included a memory controller 303 which monitors whether or not an amount of data stored by a CCPU 1 in either one of buffers 301 and 302 reaches a predetermined threshold value; when the amount of data stored by the CCPU 1 in the buffer 301, 302 reaches the threshold value, the memory controller 303 requests an ACPU 2 to acquire the data stored in the buffer and changes the storage destination of data from the CCPU to the other one of the buffers; the threshold value is a value more than a unit quantity of data which the CCPU 1 sends to the buffer 301, 302.

33 Claims, 14 Drawing Sheets

U.S. PATENT DOCUMENTS

| | | | |
|---|---|---|---|
| 6,526,495 | B1 | 2/2003 | Sevalia et al. |
| 2002/0046307 | A1 | 4/2002 | Treggiden |
| 2003/0110232 | A1* | 6/2003 | Chen et al. .................... 709/212 |

FOREIGN PATENT DOCUMENTS

| | | |
|---|---|---|
| JP | 1989161466 A | 6/1989 |
| JP | 1994110653 A | 4/1994 |
| JP | 2002073537 A | 3/2002 |
| JP | 2003099396 A | 4/2003 |
| JP | 2004206487 A | 7/2004 |
| JP | 2005142981 A | 6/2005 |

OTHER PUBLICATIONS

IPRP in this application PCT/JP2007/064608, Feb. 3, 2009, NEC Corporation.

Supplemental Search Report in Counterpart EP Patent Application No. 07791324, Mar. 19, 2010, NEC Corporation.

* cited by examiner

F I G. 5
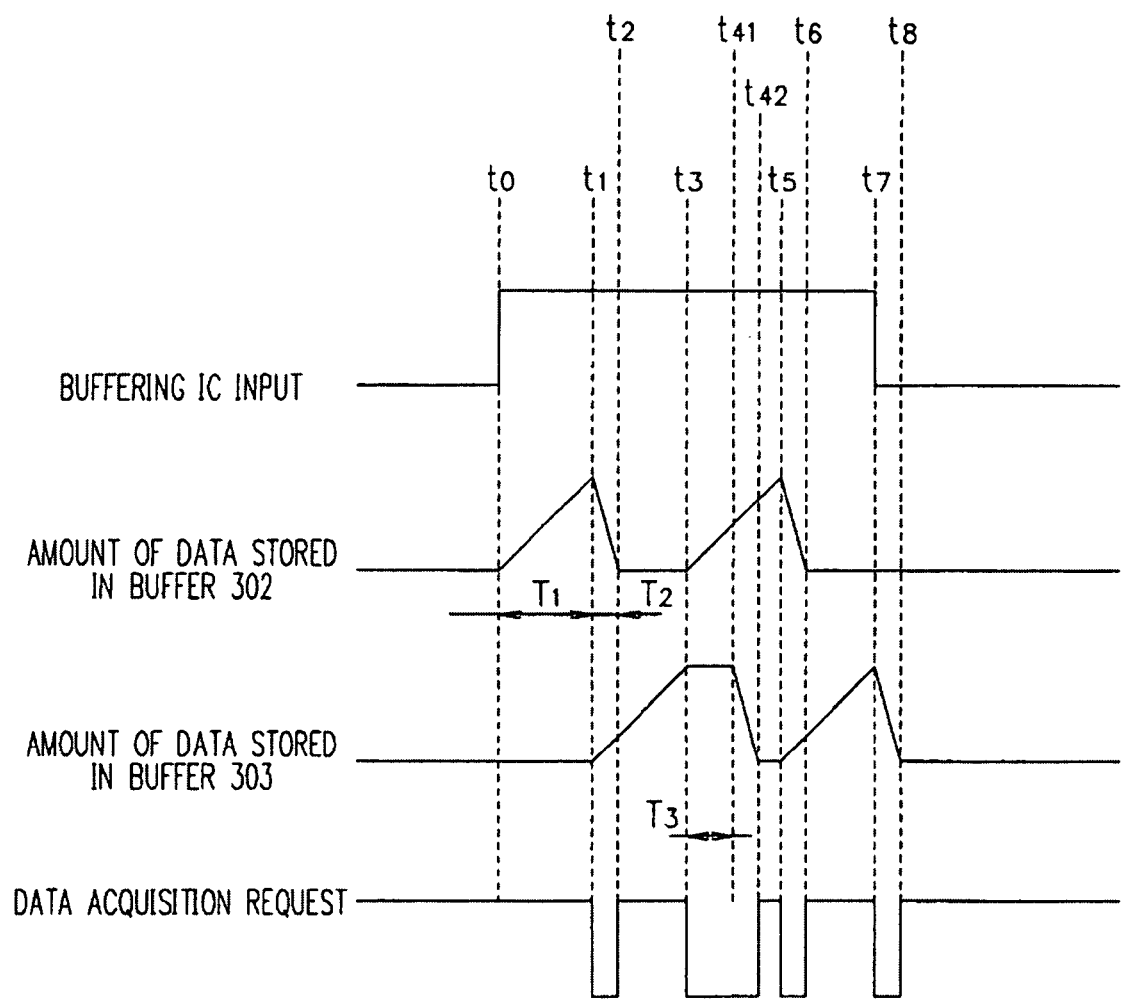

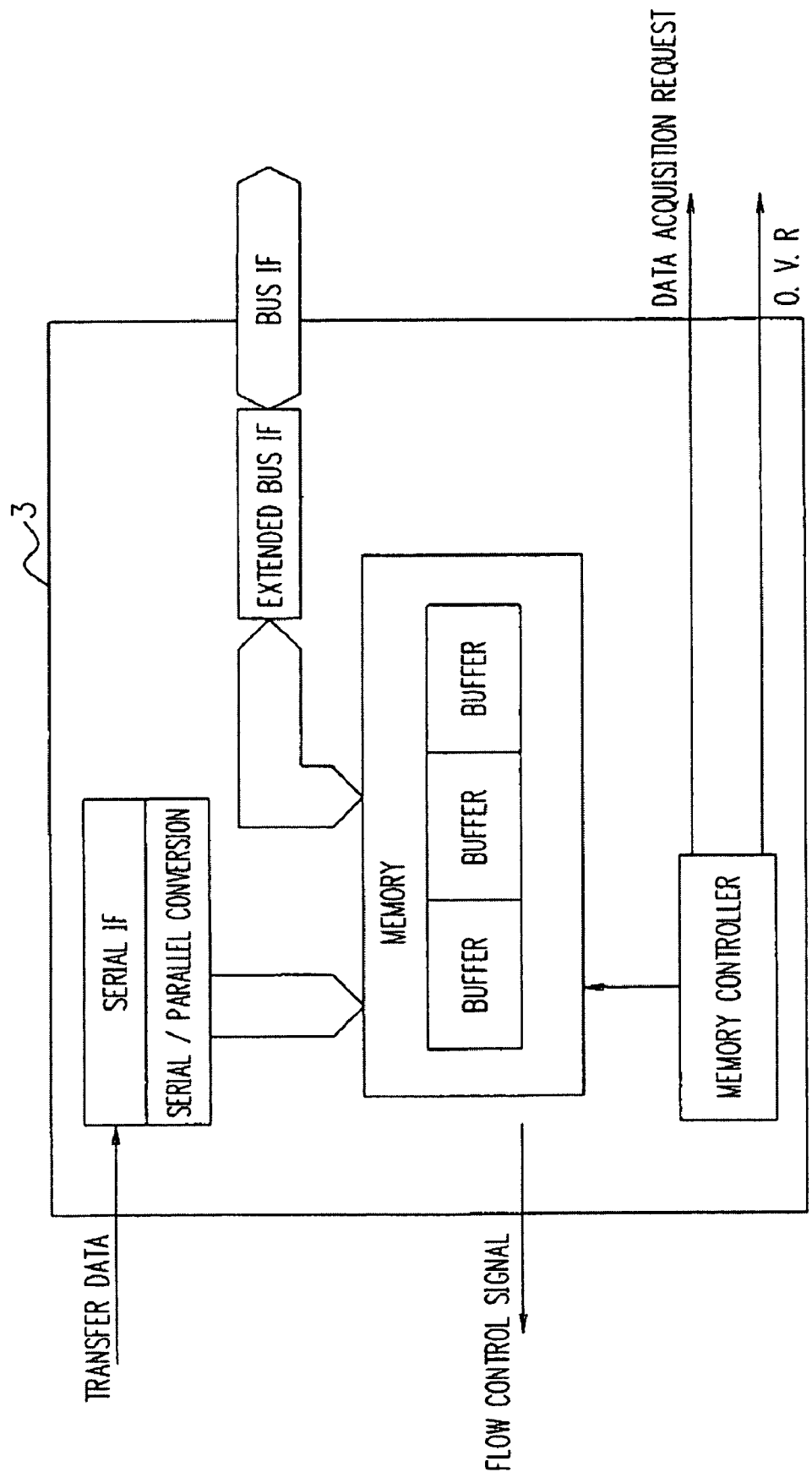

CPU CONNECTION CIRCUIT, DATA PROCESSING APPARATUS, ARITHMETIC PROCESSING DEVICE, PORTABLE COMMUNICATION TERMINAL USING THESE MODULES AND DATA TRANSFER METHOD

This application is the National Phase of PCT/JP2007/064608, filed Jul. 25, 2007, which is based upon and claims the benefit of priority from Japanese patent application No. 2006-206808, filed on Jul. 28, 2006, the disclosure of which is incorporated herein in its entirety by reference.

TECHNICAL FIELD

The present invention relates to a circuit and a method for use with two Central Processing Units (CPU) to use two buffers disposed therebetween by alternately conducting a changeover between the buffers and a portable communication terminal using the circuit, and in particular, a connection circuit and a method for connection between a communication CPU coping with High Speed Downlink Packet Access (HSDPA) communication and an application CPU and a portable communication terminal.

RELATED ART

Heretofore, there has been practically employed an information processing apparatus including two CPUs to execute predetermined processing by communicating data therebetween.

For example, there is known a portable terminal including two CPUs, i.e., a CPU for communication and a CPU for an application such that data demodulated by the communication CPU (CCPU) is processed by the application CPU (ACPU) to conduct an arbitrary application associated with communication.

As a technique related to a portable terminal including two CPUs, i.e., a CPU for communication and a CPU for an application, there exists "a portable terminal with communication function composed of a plurality of CPUs and a control method therefore" disclosed by patent document 1.

However, when a communication scheme with a high data transfer rate (e.g., HSDPA) is adopted, the amount of data to be transferred from the CCPU to the ACPU becomes greater and the data processing is not sufficiently executed on the ACPU side when a high load is imposed during the communication (particularly, when an application is running through multitask processing) depending on cases.

This is because one packet cannot be processed in the packet communication unless the entire packet is received. Particularly, in a communication scheme with a high data transfer rate such as the HSDPA, since the amount of packets to be processed in a unit time is increased, the event described above particularly leads to a problem.

Not only in the mobile communication terminals cited here as an example, it is in general almost not likely that both CPUs are equal in the data processing speed in the information processing apparatuses in which two CPUs are cooperatively operated. Hence, if the data processing is slower in the CPU on the upstream side of the data flow, the data can be normally processed only if the CPU on the downstream side waits for data to be received; however, if the data processing is slower in the CPU on the downstream side, the data outputted from the CPU on the upstream side cannot be fully processed and buffer overrun takes place.

Patent Document 1; Japanese Patent Laid-Open Publication No. 2005-142981

DISCLOSURE OF THE INVENTION

Problem to be Solved by the Invention

An exemplary object of the present invention is, devised in consideration of the problem, to provide a CPU connection circuit which is a circuit to be employed by two CPUs by alternately conducting a changeover between two buffers disposed therebetween to prevent an event that data processing cannot be fully executed by the CPU on the receiving side, a data processing apparatus, an arithmetic processing device, a portable communication terminal employing these modules, and a data transfer method.

Means for Solving the Problem

To achieve the exemplary object in accordance with a first exemplary aspect of the present invention, there is provided a CPU connection circuit including two buffers, the circuit being connected between two CPUs for relaying data transfer from at least one of the CPUs to the other one thereof, characterized by including: means for monitoring whether or not an amount of data stored by a transmission-side CPU in either one of the buffers reaches a predetermined threshold value; and means for requesting, when the amount of data stored by the transmission-side CPU in the buffer reaches the threshold value, a reception-side CPU to acquire the data stored in the buffer and changing the data storage destination of the transmission-side CPU to the other one of the buffers, the threshold value being a value more than a unit quantity of data which the transmission-side CPU sends to the buffer.

In the first exemplary aspect of the present invention, the buffer is favorably connected via a serial transmission path to the transmission-side CPU. Also, it is favorable that the buffer is connected via a parallel transmission path to the reception-side CPU.

In the first exemplary aspect of the present invention, the CPU connection circuit preferably includes two more buffers for each data transmission direction, wherein, for each data transmission, the CPU connection circuit sets the threshold value; monitors whether or not the amount of data reaches the threshold value; requests the reception-side CPU to acquire the data; and changes the data storage destination of the transmission-side CPU.

In accordance with the first exemplary aspect of the present invention, it is favorable that the CPU connection circuit relays data transfer of both directions of the two CPUs; and when both of the two CPUs desire to transfer data to the buffer, priority levels are beforehand set to determine which one of the CPUs is on the upstream side.

In either one of the configurations of the first exemplary aspects of the present invention, it is favorable to further include means for dynamically setting the threshold value according to a control signal inputted from the reception-side CPU. Furthermore, it is favorable that when the transmission-side CPU changes the buffer as the data storage destination, if there remains, in the buffer after the change, data which is previously stored and which is not acquired by the reception-side CPU, an overrun signal is outputted to at least the reception-side CPU. Moreover, a rate at which the reception-side CPU acquires data from the buffer is favorably more than a data transfer rate from the transmission-side CPU to the buffer. Also, it is favorable that the data which the transmission-side CPU sends to the buffer is packet data.

Additionally, to achieve the exemplary object in accordance with a second exemplary aspect of the present invention, there is provided a data processing apparatus for processing data by transferring the data from a transmission-side CPU to a reception-side CPU including two buffers, characterized by including: means for monitoring whether or not an amount of data stored by a transmission-side CPU in either one of the buffers reaches a predetermined threshold value; and means for requesting, when the amount of data stored by the transmission-side CPU in the buffer reaches the predetermined threshold value, arithmetic processing means of the reception-side CPU to acquire the data stored in the buffer and changing the data storage destination of the transmission-side CPU to the other one of the buffers, the threshold value being a value more than a unit quantity of data which the transmission-side CPU sends to the buffer.

In the second exemplary aspect of the present invention, the buffer is favorably connected via a serial transmission path to the transmission-side CPU. Also, the buffer is favorably connected via a parallel transmission path to the arithmetic processing means. Moreover, it is favorable to further include means for dynamically setting the threshold value according to a control signal outputted from the arithmetic processing means.

In either one of the configurations according to the second exemplary aspect of the present invention, it is favorable that when the transmission-side CPU changes the buffer as the data storage destination, if there remains, in the buffer after the change, data which is previously stored and which is not acquired by the arithmetic processing means, an overrun signal is outputted to at least the arithmetic processing means. Additionally, a rate at which the arithmetic processing means of the reception-side CPU acquires data from the buffer is favorably more than a data transfer rate from the transmission-side CPU to the buffer. Furthermore, the data which the transmission-side CPU sends to the buffer is favorably packet data.

Also, to achieve the exemplary object in accordance with a third exemplary aspect of the present invention, there is provided an arithmetic processing device, characterized by including: two buffers connected via a data transmission path to a second CPU; means for monitoring whether or not an amount of data transferred and stored by the second CPU in either one of the buffers reaches a predetermined threshold value; and means for requesting, when the amount of data stored by the second CPU in the buffer reaches the threshold value, arithmetic processing means to acquire the data stored in the buffer and changing the data storage destination of the second CPU to the other one of the buffers, the threshold value being a value more than a unit quantity of data which the second CPU sends to the buffer.

In the third exemplary aspect of the present invention, it is favorable that the threshold value is dynamically set according to a control signal from the arithmetic processing means. Moreover, it is favorable that when changing the buffer as the data storage destination of the data transferred from the second CPU, if there remains, in the buffer after the change, data which is previously stored and which is not acquired by the arithmetic processing means, an overrun signal is outputted to the arithmetic processing means. In addition, a rate at which the arithmetic processing means acquires data from the buffer is favorably more than a data transfer rate from the second CPU to the buffer. Also, the data stored by the second CPU in the buffer is favorably packet data.

Also, to achieve the exemplary object in accordance with a fourth exemplary aspect of the present invention, there is provided a data transfer method using a CPU connection circuit including two buffers and being connected between two CPUs, characterized by including: setting in the buffer, as a threshold value of an amount of stored data, a value more than a unit quantity of data which a transmission-side CPU sends to the buffer; monitoring whether or not an amount of data stored by a transmission-side CPU in either one of the buffers reaches the threshold value; and requesting, when the amount of data stored by the transmission-side CPU reaches the threshold value, a reception-side CPU to acquire the data and changing the data storage destination of the transmission-side CPU to the other one of the buffers.

Also, to achieve the exemplary object in accordance with a fifth exemplary aspect of the present invention, there is provided a data transfer method, characterized by including: connecting a reception-side CPU comprising two buffers and arithmetic processing means to a transmission-side CPU; setting in the buffer, as a threshold value of an amount of stored data, a value more than a unit quantity of data which the transmission-side CPU sends to the buffer; monitoring whether or not an amount of data stored by a transmission-side CPU in either one of the buffers reaches the threshold value; and requesting, when the amount of data stored by the transmission-side CPU reaches the threshold value, the arithmetic processing means to acquire the data and changing the data storage destination of the transmission-side CPU to the other one of the buffers.

In the fifth exemplary aspect of the present invention, it is favorable that the threshold value is dynamically set according to a control signal outputted from the arithmetic processing means. In addition, it is favorable that when changing the buffer as the storage destination of data transferred from the transmission-side CPU, if there remains, in the buffer after the change, data which is previously stored and which is not acquired by the arithmetic processing means, an overrun signal is outputted to the arithmetic processing means. Furthermore, the reception-side CPU is favorably connected to the transmission-side CPU such that a rate at which the arithmetic processing means acquires data from the buffer is more than a data transfer rate from the transmission-side CPU to the buffer.

In either one the configurations of the forth or fifth exemplary aspect of the present invention, it is favorable that transmission-side CPU sends packet data to the buffer.

In the fourth exemplary aspect of the present invention, using a CPU connection circuit including two buffers for each data transmission direction, the circuit being connected between two CPUs, the data transfer method favorably includes, for each data transmission, setting the threshold value; monitoring whether or not the amount of data reaches the threshold value; requesting the reception-side CPU to acquire the data; and changing the data storage destination of the transmission-side CPU.

Furthermore, in the fourth exemplary aspect of the present invention, the data transfer method includes beforehand setting, when both of the two CPUs desire to transfer data to the buffer, priority levels to determine which one of the CPUs is on transmission-side.

In the fourth exemplary aspect of the present invention, it is favorable to dynamically set for each transmission direction the threshold value according to a control signal inputted from the reception-side CPU. Also, it is favorable that when the transmission-side CPU changes the buffer as the data storage destination, if there remains, in the buffer after the change, data which is previously stored and which is not acquired by the reception-side CPU, an overrun signal is outputted to at least the reception-side CPU. Moreover, the two CPUs are favorably connected such that a rate at which the reception-side CPU acquires data from the buffer is more than a data transfer rate from the transmission-side CPU to the buffer. Additionally, it is favorable that for each data transmission direction, the transmission-side CPU sends packet data to the buffer.

Moreover, to achieve the exemplary object in accordance with a sixth aspect of the present invention, there is provided a portable communication terminal, characterized by including two CPUs including a communication CPU and an application CPU, wherein the CPU connection circuit in accordance with either one of the configurations of the first exemplary aspect of the present invention is disposed on a data transmission path from the communication CPU to the application CPU.

In addition, to achieve the exemplary object in accordance with an seventh exemplary aspect of the present invention, there is provided a portable communication terminal, characterized by comprising two CPUs including a communication CPU and an application CPU, the portable communication terminal configuring the data processing apparatus in accordance with either one of the configurations of the second exemplary aspect of the present invention in which the communication CPU is the transmission-side CPU and the application CPU is the reception-side CPU.

Also, to achieve the exemplary object in accordance with an eighth exemplary aspect of the present invention, there is provided a portable communication terminal, characterized by including two CPUs including a communication CPU and an application CPU, wherein the arithmetic processing device in accordance with either one of the configurations of the third exemplary aspect of the present invention is applied as the application processing CPU.

Advantages of the Invention

In accordance with the present invention, there can be provided a CPU connection circuit which is a circuit to be employed by two CPUs by alternately conducting a changeover between two buffers disposed therebetween to prevent an event that data processing cannot be fully executed by the CPU on the receiving side, a data processing apparatus, an arithmetic processing device, a portable communication terminal using these modules, and a data transfer method.

BEST MODE FOR CARRYING OUT THE INVENTION

Principle of Invention

In the following description, a situation wherein two CPUs are a communication CPU and an application CPU is used as an example; however, the description similarly applies to CPUs aiming at other processing.

FIG. 1 shows a state of connections between two CPUs and a buffering IC.

A buffering IC 3 in which a circuit including two buffers and a switch to alternately conduct, in data transfer between a communication CPU (CCPU) 1 and an application CPU (ACPU) 2, a changeover therebetween for setting either of the buffers as a data write buffer is formed is disposed between the two CPUs.

Each CPU and the buffering IC 3 are favorably connected to each other such that the data transfer speed from the buffering IC 3 to the ACPU 2 is higher than that from the CCPU 1 to the buffering IC 3. Here, the above condition is satisfied by using a serial IF connection between the CCPU 1 and the buffering IC 3 and a bus IF connection between the buffering IC 3 and the ACPU 2; however, other connection methods may also be available.

When the amount of stored data of one of the two buffers (the buffer to write data therein) reaches a setting value, the buffer (data write buffer) as the storage destination of data transferred from the CCPU 1 is replaced by the other buffer. Incidentally, the setting value is set to the buffering IC 3, and the determination of the storage data amount is also conducted by the buffering IC 3.

After replacing the data write buffer, the buffering IC 3 outputs a data acquisition request to the ACPU 2. When the request is received from the buffering IC 3, the ACPU 2 tries by Direct Memory Access (DMA) to acquire data from the buffer used as a data write buffer before the replacement. In the operation, since the buffer of the buffering IC 3 is regarded as a memory by the ACPU 2, the ACPU 2 conducts an operation similar to the operation to read data from a memory.

When the stored data amount in the buffer again reaches the setting value, the buffering IC 3 replaces the data write buffer by the other buffer (which is initially a data write buffer) to similarly store data therein and outputs a data acquisition request to the ACPU 2 to repeatedly conduct similar operation.

Incidentally, the CCPU 1 does not recognize existence of the buffering IC 3 and only outputs data.

Due to the operation described above, even if the ACPU 2 cannot immediately acquire the data at reception of the data acquisition request from the buffering IC 3, data loss does not take place. Hence, it is possible to prevent an event in which the ACPU 2 cannot fully process the data.

In this regard, the setting value may be arbitrarily set according to an application to be executed by the ACPU 2. When a large setting value is used, the preventive effect of data loss due to the data acquisition delay of the ACPU 2 is increased, but the data processing by the ACPU 2 is delayed. Contrarily, when a small setting value is used, the preventive effect of data loss due to the data acquisition delay of the ACPU 2 becomes smaller, but the data processing is executed by the ACPU 2 almost in a real-time fashion. Therefore, it is only necessary that the setting value is determined according to the type of the application to be executed by the ACPU 2 to balance the data loss preventive effect and the real-time property of the data processing.

Additionally, the setting value need not be necessarily common to two buffers, but different values may be set to the respective buffers. Furthermore, the setting value is not limited to a value which uses only part of the buffer, but the entire buffer may be used. For example, for an X-byte buffer, an X-byte setting value may be set.

When a large setting value is used, the buffer overrun preventive effect is increased and the ACPU operation ratio is lowered (because the ACPU can acquire the data from the buffer at a time); however, the data cannot be acquired by the ACPU side until a predetermined amount of data is stored in the buffer, which causes a delay. Hence, depending on purposes, the setting is to be only conducted to optimally balance the buffer overrun preventive effect and the data delay length.

For example, to communicate packet data between the CCPU and the ACPU, it is favorable to set the capacity of one packet as the buffer setting value. This is because in the case of packet data, the processing by the application is possible only after the data of one packet is stored (in other words, even if the ACPU acquires data of each data size less than the one packet from the buffer, the ACPU cannot process the acquired data; namely, only when one packet of data is obtained, the ACPU process the data).

However, if the setting values of both buffers are equal to the unit quantity of data inputted from the CCPU 1, the delay in the data acquisition by the ACPU 2 immediately leads to the buffer overrun. Hence, either one of the buffer setting values is required to be more than the unit quantity of data inputted from the CCPU 1.

In a concrete example, in a situation wherein the CCPU 1 processes data in the unit of one byte (input data in the buffering IC 3), if both setting values of the buffers are one byte, the buffer overrun occurs immediately when the data acquisition by the ACPU 2 delays, and hence the data loss preventive effect cannot be obtained. In this situation, by setting the value equal to or more than two to either one of the buffers, it is possible to attain the data loss preventive effect.

Even if the buffer capacity is increased, there does not occur any trouble in operation. However, the buffer with a large capacity is expensive and has a large size; hence, as for the manufacturing cost, it will be disadvantageous to designate a setting value to use only part of the buffer.

On the other hand, when the buffer capacity is too small, it is likely that the buffer overrun effect cannot be sufficiently attained even if the setting value is designated to use the overall capacity of the buffer. Therefore, it is favorable to apply a buffer having a capacity sufficient to obtain the buffer overrun preventive effect according to the size of data sent from the CCPU and the data processing performance of the ACPU.

Subsequently, description will be given of a favorable mode for carrying out the present invention based on the principle described above.

First Exemplary Embodiment

Description will be given of a first exemplary embodiment to which the present invention is favorably applied. The data processing apparatus according to the exemplary embodiment is configured, as shown in FIG. 1, such that a buffering IC 3 in which a circuit including two buffers and a switch to alternately conducting a changeover therebetween is formed is arranged between a communication CPU (CCPU) 1 and an application CPU (ACPU) 2.

FIG. 2 shows inner structure of the buffering IC 3. In the buffering IC 3, a CPU connection circuit is constructed.

The buffering IC 3 includes buffers capable of storing data of two frames. Of these frames, one frame is adopted as a data write frame to write data from the CCPU 1 and the other one frame is used as a data reader frame by the ACPU 2. These are alternately changed to each other in use thereof.

Furthermore, by a memory controller 301 in the buffering IC 3, the amount of data which can be stored in the buffer of one frame is arbitrarily set in advance.

For a data acquisition request from the buffering IC 3 to the ACPU 2, a "data acquisition request signal" is employed. This signal is asserted at timing when the data read buffer satisfies a condition for the ACPU 2 to read data therefrom (timing when the data write buffer is changed to the data read buffer) and is negated at timing when the data is read from the buffer by the ACPU 2.

Also, in a situation wherein data is stored in both buffers, if data is additionally received from the CCPU 1, the buffering IC 3 can generate an overrun interruption signal (OVR) to notify the ACPU 2 side of the occurrence of data loss.

At detection of the interruption, the ACPU 2 executes error processing for each system.

Moreover, the buffering IC 3 possesses a function of a flow control signal controllable from the ACPU 2. By controlling this signal, retransmission of data can be notified to the CCPU 1.

FIG. 3 shows a flow of operation of the buffering IC 3. Here, in the initial state, the buffer 302 is a data write buffer and the buffer 303 is a data read buffer.

When data is received from the CCPU 1, the memory controller 301 confirms whether or not previously stored data is remaining in the data write buffer (buffer 302; step S101). If the data is remaining therein, the controller 301 executes overrun processing.

If the data is not remaining therein (yes in step S101), the memory controller 301 stores the data received from the CCPU 1 in the data write buffer and confirms whether or not the amount of data stored in the data write buffer reaches a setting value (step S102).

If the stored data amount of the data write buffer does not reach the setting value (no in step S102), the memory controller 301 stores the data received from the CCPU 1 in the data write buffer until the stored data amount reaches the setting value.

When the stored data amount of the data write buffer reaches the setting value (yes in step S102), the memory controller 301 conducts a changeover of the data write buffer from the buffer 302 to the buffer 303 (step S103). Thereafter, the controller 301 transmits a data acquisition request of data stored in the buffer 302 to the ACPU 2 (step S104).

The memory controller 301 confirms whether or not previously stored data is remaining in the buffer 303 changed as the data write buffer (step S101). If the data is remaining therein, the controller 301 executes overrun processing.

If the data is not remaining in the data write buffer (yes in step S101), the memory controller 301 stores the data received from the CCPU 1 in the data write buffer and confirms whether or not the amount of data stored in the data write buffer reaches a setting value (step S102).

If the stored data amount of the data write buffer does not reach the setting value (no in step S102), the memory controller 301 stores the data received from the CCPU 1 in the data write buffer until the stored data amount reaches the setting value.

When the stored data amount of the data write buffer reaches the setting value (yes in step S102), the memory controller 301 conducts a changeover of the data write buffer from the buffer 303 to the buffer 302 (step S103). Thereafter, the controller 301 transmits a data acquisition request of data stored in the buffer 303 to the ACPU 2 (step S104).

After this point, so long as data is received from the CCPU 1, the memory controller 301 repeatedly executes similarly processing.

FIG. 4 shows an example of the data transfer operation between the CPUs using the buffering IC 3.

Assume here that the ratio between the data transfer speed from the CCPU 1 to the buffering IC 3 and that from the buffering IC 3 to the ACPU 2 is one to four.

At time t0, the CCPU 1 starts inputting data to the buffering IC 3. The memory controller 301 stores the inputted data in the buffer 302.

At time t1, the stored data amount of the buffer 302 reaches the setting value. The memory controller 301 changes the data write buffer to the buffer 303 and asserts the acquisition request signal of the data stored in the buffer 302 to output the signal to the ACPU 2.

At time t2, the data stored in the buffer 302 is completely acquired by the ACPU 2 and the data acquisition request signal is negated.

At time t3, when the stored data amount of the buffer 303 reaches the setting value, the memory controller 301 changes the data write buffer to the buffer 302 and asserts the acquisition request signal of data stored in the buffer 303 to output the signal to the ACPU 2.

At time t4, the data stored in the buffer 303 is completely acquired by the ACPU 2 and the data acquisition request signal is negated.

Subsequently, similar processing is repeatedly executed; at time t8, the data acquisition request signal is negated to thereby complete transfer of data from the CCPU 1 to the ACPU 2.

FIG. 5 shows another example of the data transfer operation between the CPUs using the buffering IC 3.

As in the description above, it is assumed that the ratio between the data transfer speed from the CCPU 1 to the buffering IC 3 and that from the buffering IC 3 to the ACPU 2 is one to four.

At time t0, the CCPU 1 starts inputting data to the buffering IC 3. The memory controller 301 stores the inputted data in the buffer 302.

At time t1, the stored data amount of the buffer 302 reaches the setting value. The memory controller 301 changes the data write buffer to the buffer 303 and asserts the acquisition request signal of the data stored in the buffer 302 to output the signal to the ACPU 2.

At time t2, the data stored in the buffer 302 is completely acquired by the ACPU 2 and the data acquisition request signal is negated.

At time t3, when the stored data amount of the buffer 303 reaches the setting value, the memory controller 301 changes the data write buffer to the buffer 302 and asserts the acquisition request signal of data stored in the buffer 303 to output the signal to the ACPU 2. Here, the ACPU 2 is in a busy state and cannot immediately start acquiring the data even if the data acquisition request is received.

At time t41, the ACPU 2 starts acquiring data stored in the buffer 303. Incidentally, it is assumed that an interval ($T_3$) between time t3 to time t41 is less than the difference ($T_1$−$T_2$) between a period of time ($T_1$) in which the stored data amount of the buffer reaches the setting value and a period of time ($T_2$) required for the ACPU 2 to acquire the data from the buffer (in this case, required storing time $T_1$=4a, required acquisition time $T_2$=a, and delay time $T_3$=2a).

At time t42, the data stored in the buffer 303 is completely acquired by ACPU 2 and the data acquisition request signal is negated.

At time t5, the stored data amount of the buffer 302 reaches the setting value. The memory controller 301 changes the data write buffer to the buffer 303 and asserts the acquisition request signal of data stored in the buffer 302 to output the signal to the ACPU 2.

At time t6, the data stored in the buffer 302 is completely acquired by the ACPU 2 and the data acquisition request signal is negated.

Subsequently, similar processing is repeatedly executed; at time t8, the data acquisition request signal is negated to thereby complete transfer of data from the CCPU 1 to the ACPU 2.

FIG. 6 shows further another example of the data transfer operation between the CPUs using the buffering IC 3.

As in the description above, it is assumed that the ratio between the data transfer speed from the CCPU 1 to the buffering IC 3 and that from the buffering IC 3 to the ACPU 2 is one to four.

At time t0, the CCPU 1 starts inputting data to the buffering IC 3. The memory controller 301 stores the inputted data in the buffer 302.

At time t1, the stored data amount of the buffer 302 reaches the setting value. The memory controller 301 changes the data write buffer to the buffer 303 and asserts the acquisition request signal of the data stored in the buffer 302 to output the signal to the ACPU 2.

At time t2, the data stored in the buffer 302 is completely acquired by the ACPU 2 and the data acquisition request signal is negated.

At time t3, when the stored data amount of the buffer 303 reaches the setting value, the memory controller 301 changes the data write buffer to the buffer 302 and asserts the acquisition request signal of data stored in the buffer 303 to output the signal to the ACPU 2. Here, the ACPU 2 is in a busy state and cannot immediately start acquiring the data even if the data acquisition request is received.

At time t43, the ACPU 2 starts acquiring data stored in the buffer 303. Incidentally, it is assumed that an interval $T_3$ between time t3 to time t43 is more than the difference ($T_1$−$T_2$) between a period of time ($T_1$) in which the stored data amount of the buffer reaches the setting value and a period of time ($T_2$) required for the ACPU 2 to acquire the data from the buffer (required storing time $T_1$=4a, required acquisition time $T_2$=a, and delay time $T_3$=3.3a).

At time t44, the stored data amount of the buffer 302 reaches the setting value. The memory controller 301 attempts to change the data write buffer to the buffer 303; however, at this point of time, the data stored in the buffer 303 is not completely acquired by the ACPU 2. Hence, the memory controller 301 generates an overrun interruption signal (OVR) to notify the ACPU 2 side of the occurrence of data loss.

As can be seen from the description above, when the data acquisition delay time $T_3$ of the ACPU 2 is less than the difference ($T_1$−$T_2$) between the period of time ($T_1$) in which the stored data amount of the buffer reaches the setting value and the period of time ($T_2$) required for the ACPU 2 to acquire the data from the buffer, it is possible to prevent occurrence of data loss due to the buffer overrun.

As above, according to the CPU connection circuit in accordance with the exemplary embodiment, the serial transfer speed between the ACPU and the CCPU can be improved to match with the mean processing speed of the CCPU.

Second Exemplary Embodiment

Description will be given of a second exemplary embodiment to which the present invention is suitably applied.

The data processing apparatus according to the exemplary embodiment is configured such that as in the first exemplary embodiment, a buffering IC 31 is connected between the CCPU 1 and the ACPU 2. However, as shown in FIG. 7, an application notification signal is inputted from the ACPU 2 to the buffering IC 31 (memory controller 311) in this exemplary embodiment.

The application notification signal is information to identify one of the applications that is to be executed by the ACPU 2.

When an application associated with communication of data with the CCPU 1 is activated in the ACPU 2, the ACPU 2 outputs an application notification signal to the buffering IC 31.

When the buffering IC 31 receives the signal, the memory controller 311 sets threshold values to the buffers 312 and 313, the threshold values being optimal for the activated application to receive data from the CCPU 1.

As above, by changing the threshold values set to the buffers 312 and 313 according to the type of the application to be executed by the ACPU 2, it is possible to transfer data from the CCPU 1 to the ACPU 2 under an optimal condition according to the type of the application (occurrence of data loss is suppressed and the acquisition delay on the ACPU side does not occur easily).

Incidentally, in a situation wherein the ACPU 2 executes multitask processing by simultaneously executing a plurality of applications, it goes without saying that the buffer setting values may be changed according to the combination of the applications to be executed.

Third Exemplary Embodiment

Description will be given of a third exemplary embodiment to which the present invention is suitably applied.

FIG. 8 shows structure of the data processing apparatus according to the exemplary embodiment. As shown in FIG. 8, this exemplary embodiment is constructed such that the function of the buffering IC 3 of the first exemplary embodiment is incorporated as a buffering section 30 in the ACPU 201.

Since the overall operation of the data processing apparatus is similar to that of the first exemplary embodiment above, duplicated description thereof will be avoided.

Fourth Exemplary Embodiment

Description will be given of a fourth exemplary embodiment to which the present invention is suitably applied.

FIG. 9 shows a configuration of the data processing apparatus according to the exemplary embodiment. In the data processing apparatus according to the exemplary embodiment, a first CPU 10 and a second CPU 20 are connected respectively via a serial IF and a bus IF to a buffering IC 32. Moreover, the first CPU 10 and the second CPU 20 bidirectionally transfer data via the buffering IC 32.

FIG. 10 shows structure of a CPU connection circuit in the buffering IC 32. The exemplary embodiment includes, in the buffering IC 32, only one memory controller 321, but two memories, two serial IFs, and two bus IFs (memories 322*a* and 322*b*, serial IFs 323*a* and 323*b*, and bus IFs 324*a* and 324*b*) in which one piece of each pair thereof (the memory 322*a*, the serial IF 323*a*, the bus IF 324*a*) is used to transmit data from the first CPU 10 to the second CPU 20, and the other piece of each pair thereof (the memory 322*b*, the serial IF 323*b*, the bus IF 324*b*) is employed to transmit data from the second CPU 20 to the first CPU 10.

The operation to transfer data from the first CPU 10 to the second CPU 20 and that from the second CPU 20 to the first CPU 10 are similar to the transfer operation from the CCPU 1 to the ACPU 2 of the first exemplary embodiment (the memory controller 321 individually controls the data transfer in both directions); hence, duplicated description thereof will be avoided.

Fifth Exemplary Embodiment

Description will be given of a fifth exemplary embodiment to which the present invention is suitably applied.

The configuration of the data processing apparatus according to the exemplary embodiment is similar to that of the fourth exemplary embodiment in which a first CPU and a second CPU are connected respectively via a serial IF and a bus IF to a buffering IC 33. Moreover, the first CPU and the second CPU bidirectionally transfer data via the buffering IC 33. However, as shown in FIG. 11, a data write request signal is inputted from each of the first and second CPUs to the buffering IC 33 in the exemplary embodiment. The data write request signal is inputted to a memory controller 331 in the buffering IC 33 before the CPU writes (transfers) data in the buffer.

FIG. 12 shows structure of a CPU connection circuit in the buffering IC 33.

In the exemplary embodiment, the buffering IC 33 includes two serial IFs and two bus IFs (serial IFs 333*a* and 333*b* and bus IFs 334*a* and 334*b*) in which one piece of each pair thereof (the serial IF 333*a*, the bus IF 334*a*) is used to transmit data from the first CPU to the second CPU and the other piece of each pair thereof (the serial IF 333*b*, the bus IF 334*b*) is used to transmit data from the second CPU to the first CPU. Incidentally, unlike the fourth exemplary embodiment, the buffering IC 33 includes only one memory 332 (two buffer frames).

In the data processing apparatus according to the exemplary embodiment, since the first CPU 10 and the second CPU 20 share one memory 332, it is required to control these CPUs not to simultaneously carry out the data write operation. Therefore, the memory controller 331 controls operation as follows on the basis of a data write request from each CPU.

A priority level of data write operation is set to each of the first and second CPUs; when both CPUs request the data write operation, the CPU having a higher priority level is allowed to conduct the data write operation. In a situation wherein when the CPU with a lower priority level is conducting a data write operation, if the CPU with a higher priority level requests a data write operation, the operation being processed may be continued or may be interrupted to execute the data write operation of the CPU with a higher priority level.

Incidentally, the software may be beforehand set such that each of the first and second CPUs 10 and 20 indicates data transmission timing by use of a flow control signal to the associated CPU to thereby exclusively conduct the data write operation. In this case, a data write request from each CPU is not required.

Since the operation (buffer) of the data transfer itself is similar to that of the first exemplary embodiment, description thereof will be avoided.

Six Exemplary Embodiment

Description will be given of a sixth exemplary embodiment to which the present invention is suitably applied.

FIG. 13 shows a configuration of a portable telephone terminal according to the exemplary embodiment. The portable telephone terminal is a dual-CPU cellular phone including two CPUs, i.e., a communication CPU and an application CPU.

Description will be given of operation of the portable telephone terminal according to the present invention.

A radio signal received by an antenna 21 is converted by a radio circuit 22 into an electric signal, which is then converted by an analog signal processing section 23 into a digital signal. The digital signal converted by the analog signal processing section 23 is inputted via a digital signal processing section 24 to a CCPU 1. The digital signal fed to the CCPU 1 is sent as digital data via a buffering IC 3 to an ACPU 2. The ACPU 2 processes the inputted digital data and conducts processing, for example, to store the processed data in a memory 25, to produce sound from an audio output section 27, or to display an image on a display section 28.

On the other hand, the ACPU 2 processes an input operation conducted via an operation section 26 and sound inputted via an audio input section 29 to transfer the processed data to the CCPU 1. The CCPU 1 sends the data inputted from the ACPU 2 to the digital signal processing section 24 to convert the data into an analog electric signal. The digital signal processing section 24 inputs the analog electric signal via the analog signal processing section 23 to the radio circuit 22. The radio circuit 22 converts the inputted analog electric signal into a radio signal and transmits the signal via the antenna 21.

By disposing the buffering IC similar to that of the first exemplary embodiment between the CCPU 1 and the ACPU 2, even if the ACPU is busy during communication, the buffer overrun does not easily take place and stableness of communication quality is improved.

Since the data transfer operation itself from the CCPU to the ACPU is similar to that of the first exemplary embodiment, duplicated description thereof will be avoided.

Incidentally, in this case, the CCPU and the ACPU are connected to each other by a circuit configuration similar to that of the first exemplary embodiment; however, it goes without saying that the CCPU and the ACPU may be connected to each other by a circuit configuration similar to that of the second or third exemplary embodiment.

Also, the first CPU and the second CPU of the fourth or fifth exemplary embodiment may be obviously employed as the CCPU and the ACPU.

Incidentally, the exemplary embodiments are suitable embodying examples of the present invention, but the present invention is not restricted by the exemplary embodiments.

For example, in each exemplary embodiment, a two-frame buffer is alternately changed over between a data read buffer and a data write buffer in the example of the configuration; however, it is also possible that the configuration includes three or more buffers as shown in FIG. 14 to use these buffers by rotation.

As above, various variations are possible for the present invention.

BRIEF DESCRIPTION OF THE DRAWINGS

FIG. 5 is a diagram showing an example of a data transfer operation between the CPUs using the buffering IC.

FIG. 14 is a diagram showing a configuration of a buffering IC including a three-frame buffer.

DESCRIPTION OF REFERENCE NUMERALS

Figure 1:
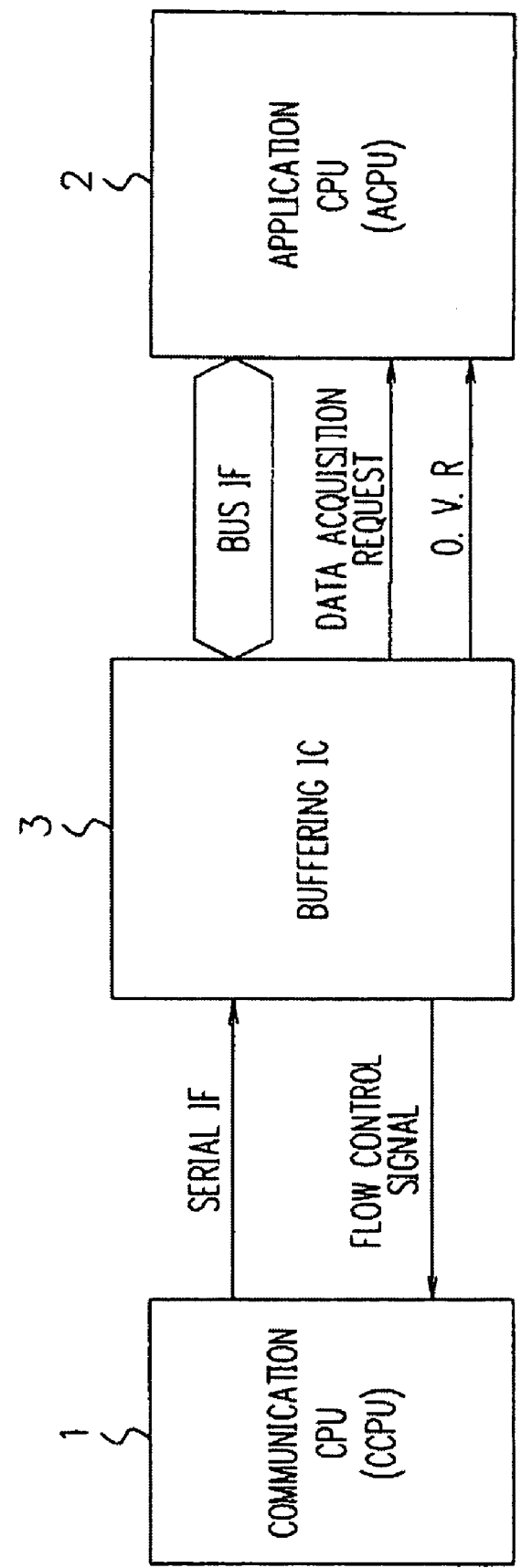
FIG. 1 is a diagram showing a connection state between two CPUs and a buffering IC of a data processing apparatus according to a first exemplary embodiment to which the present invention is suitably applied.
Figure 2:
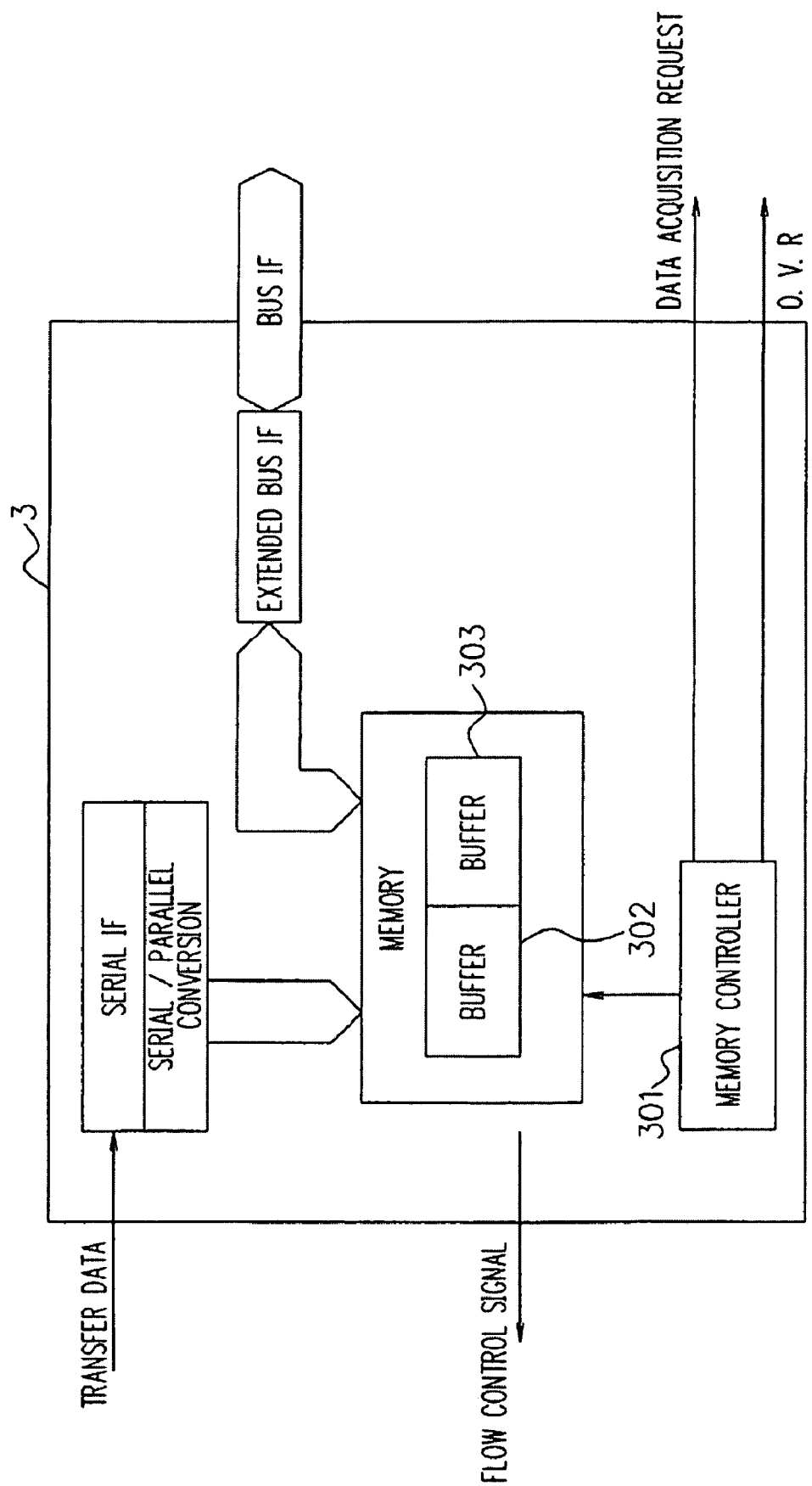
FIG. 2 is a diagram showing inner structure of the buffering IC.
Figure 3:
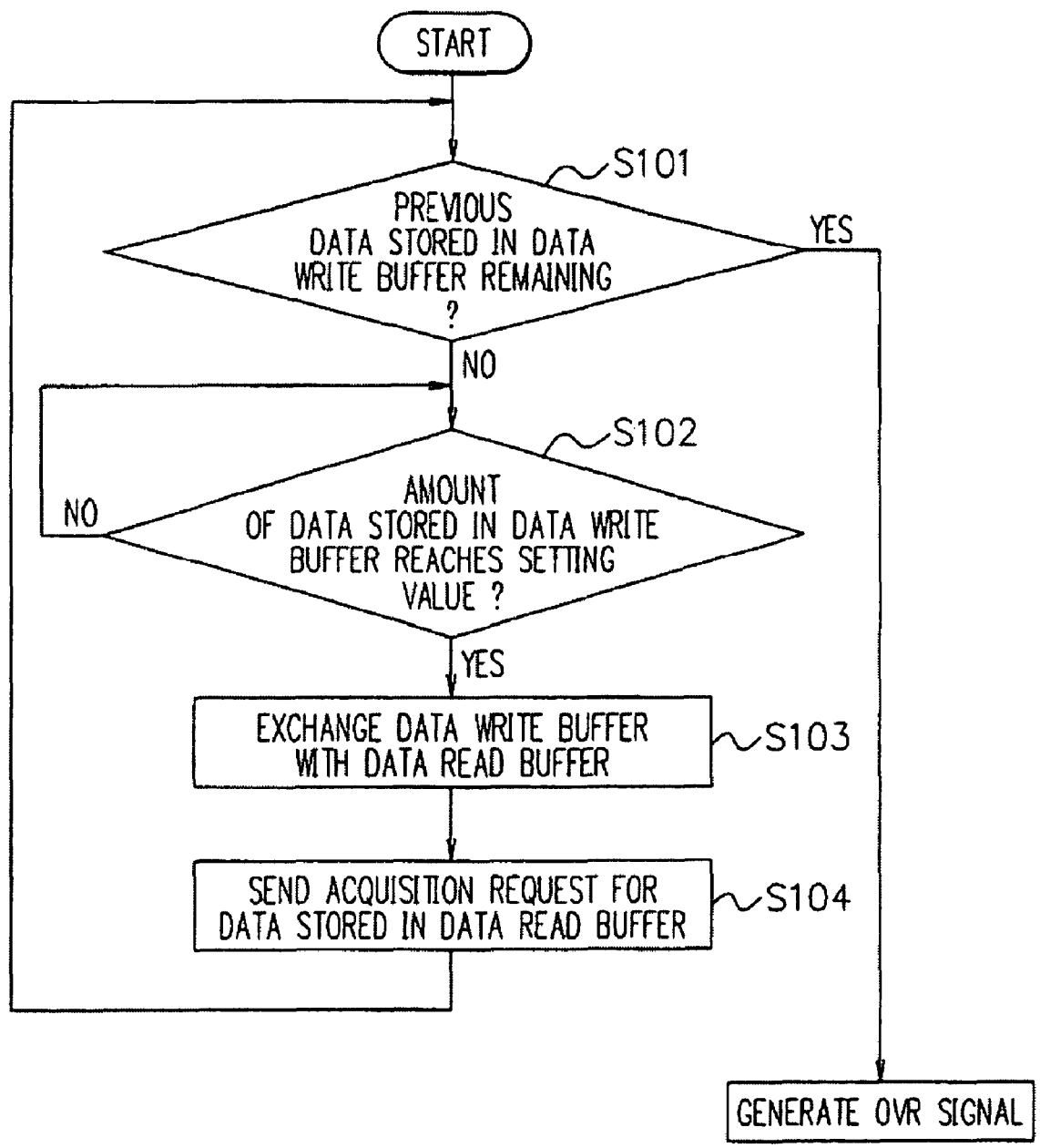
FIG. 3 is a flowchart showing an operation flow of the buffering IC.
Figure 4:
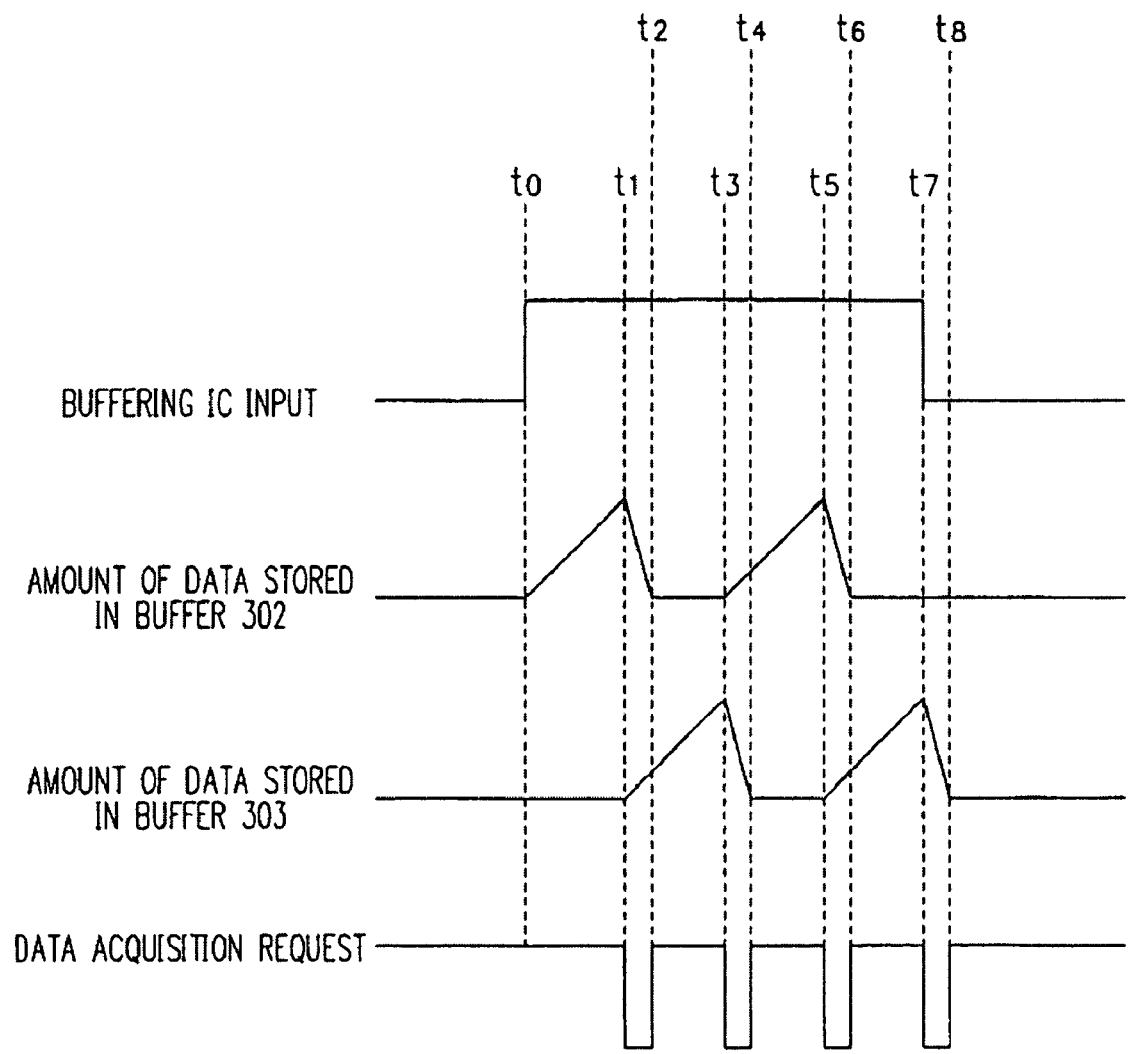
FIG. 4 is a diagram showing an example of a data transfer operation between the CPUs using the buffering IC.
Figure 6:
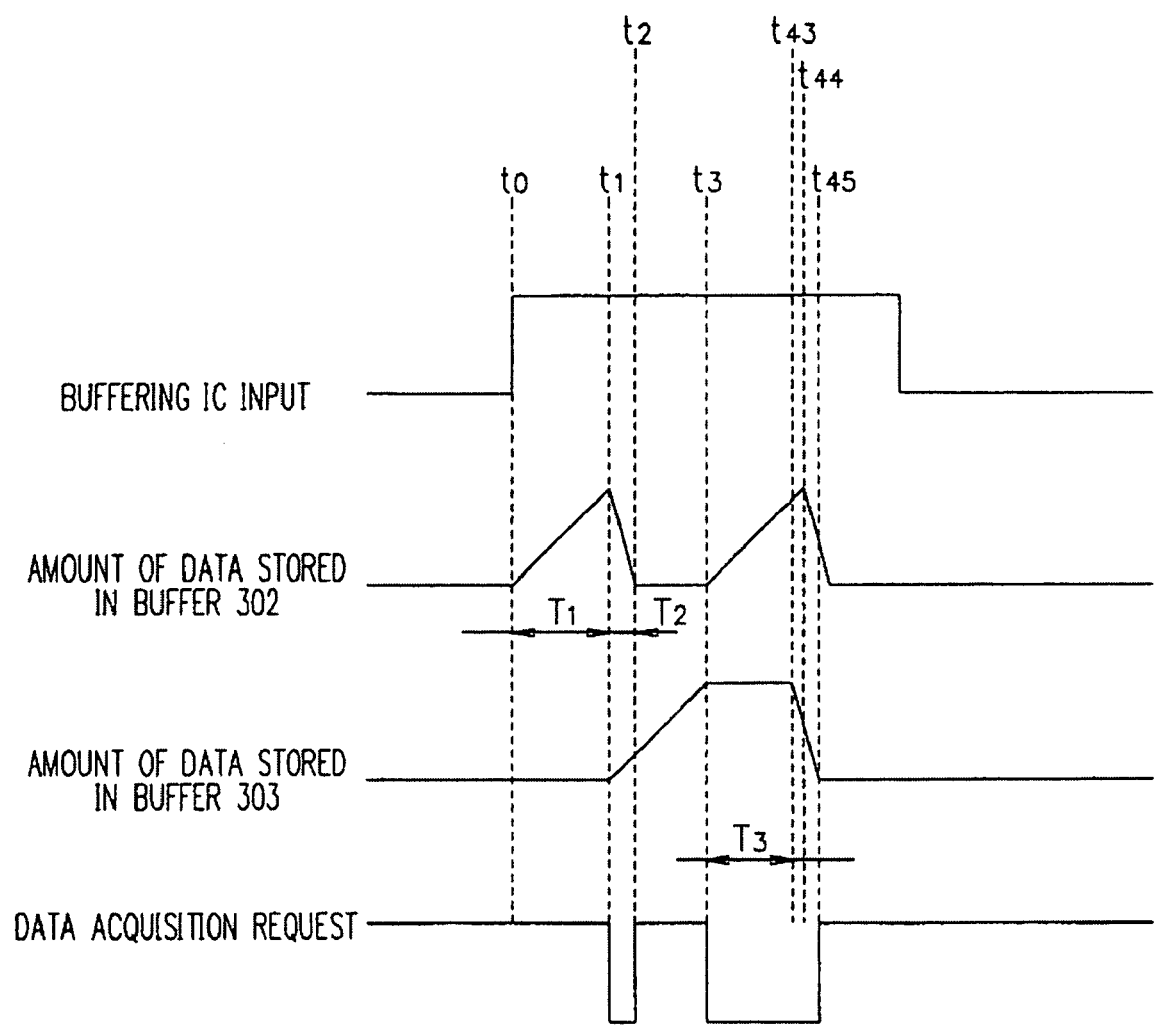
FIG. 6 is a diagram showing an example of a data transfer operation between the CPUs using the buffering IC.
Figure 7:
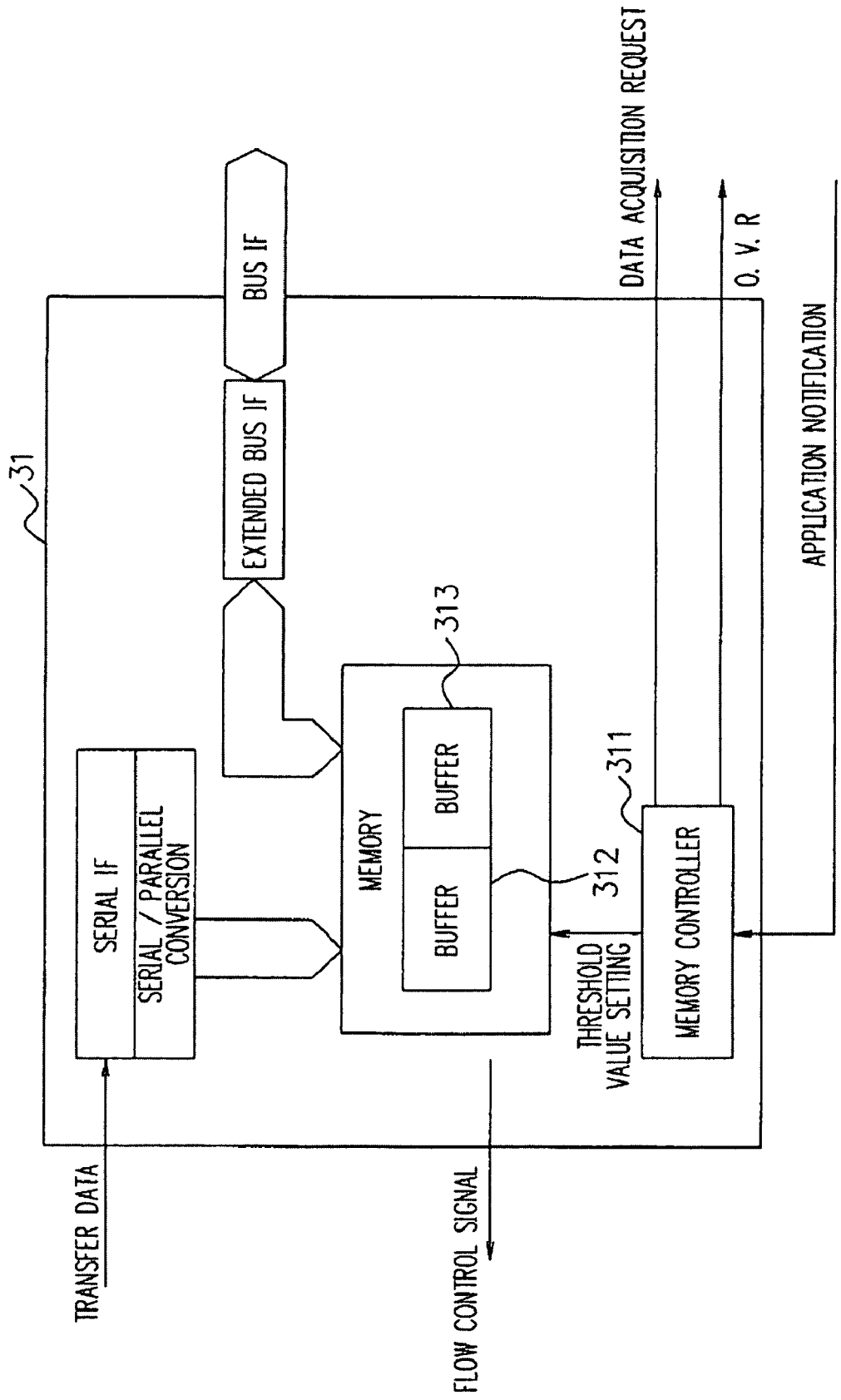
FIG. 7 is a diagram showing a configuration of a buffering IC of a data processing apparatus according to a second exemplary embodiment to which the present invention is suitably applied.
Figure 8:
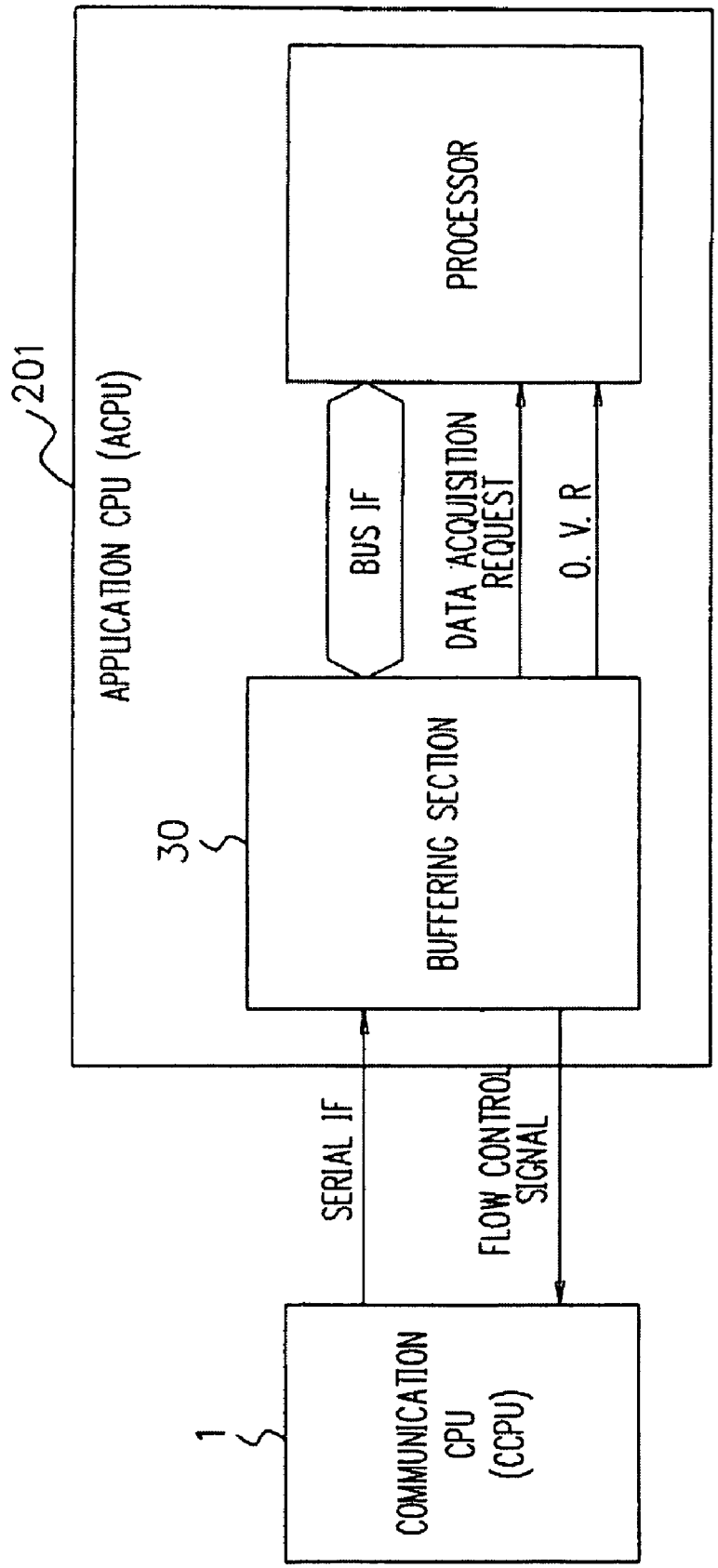
FIG. 8 is a diagram showing a configuration of an ACPU of a data processing apparatus according to a third exemplary embodiment to which the present invention is suitably applied.
Figure 9:
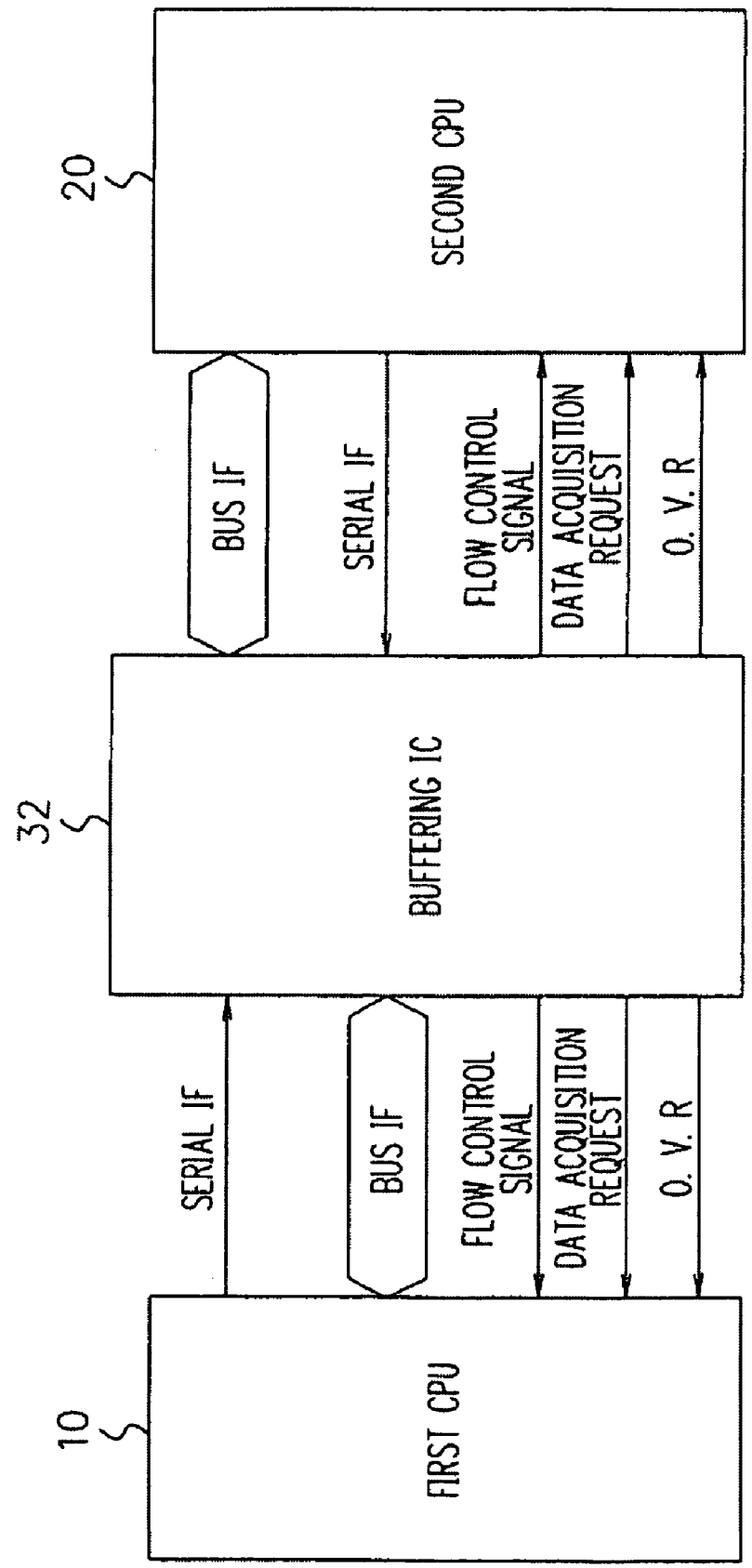
FIG. 9 is a diagram showing a configuration of a data processing apparatus according to a fourth exemplary embodiment to which the present invention is suitably applied.
Figure 10:
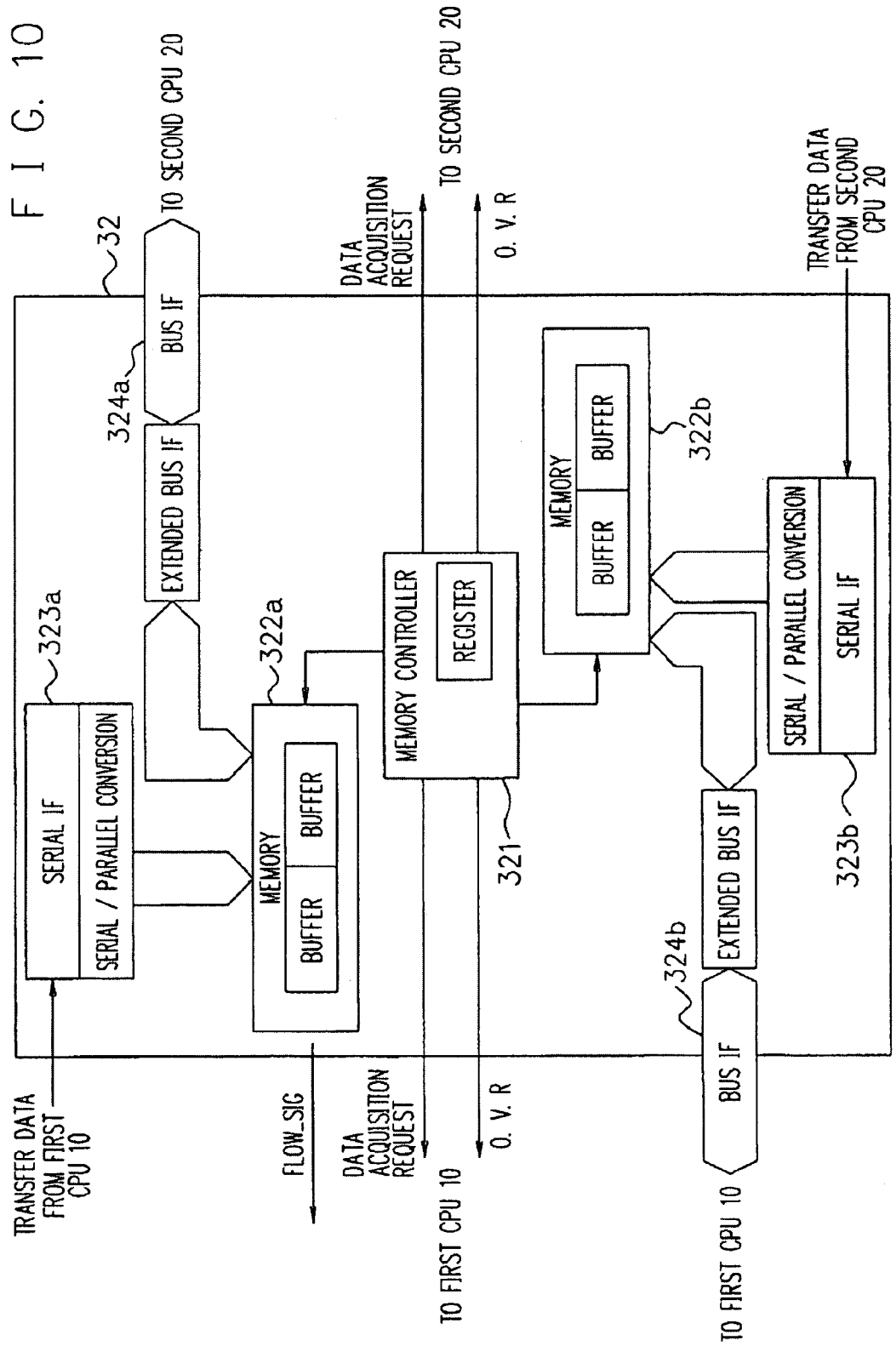
FIG. 10 is a diagram showing a configuration of a buffering IC of the data processing apparatus according to the fourth exemplary embodiment.
Figure 11:
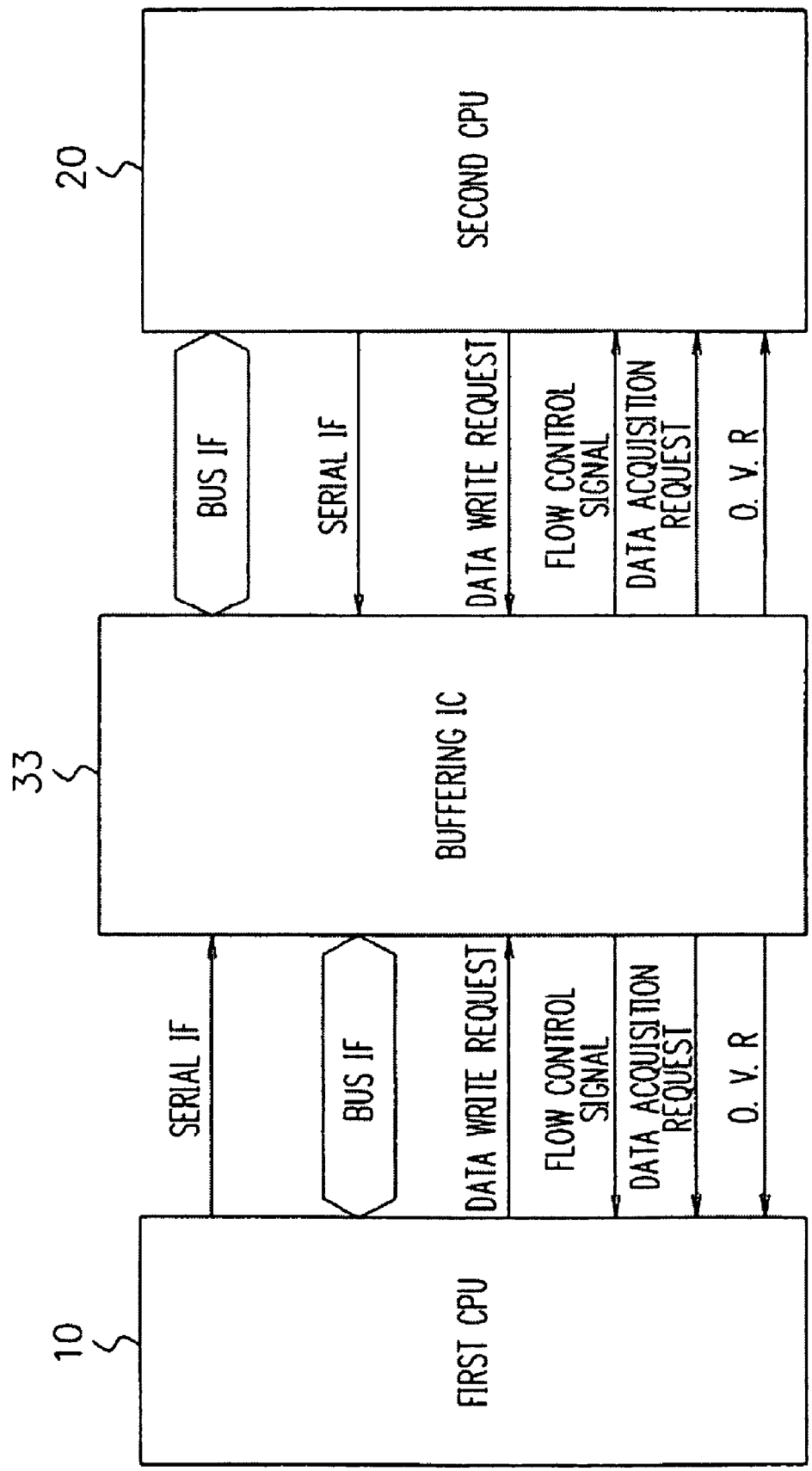
FIG. 11 is a diagram showing a configuration of a data processing apparatus according to a fifth exemplary embodiment to which the present invention is suitably applied.
Figure 12:
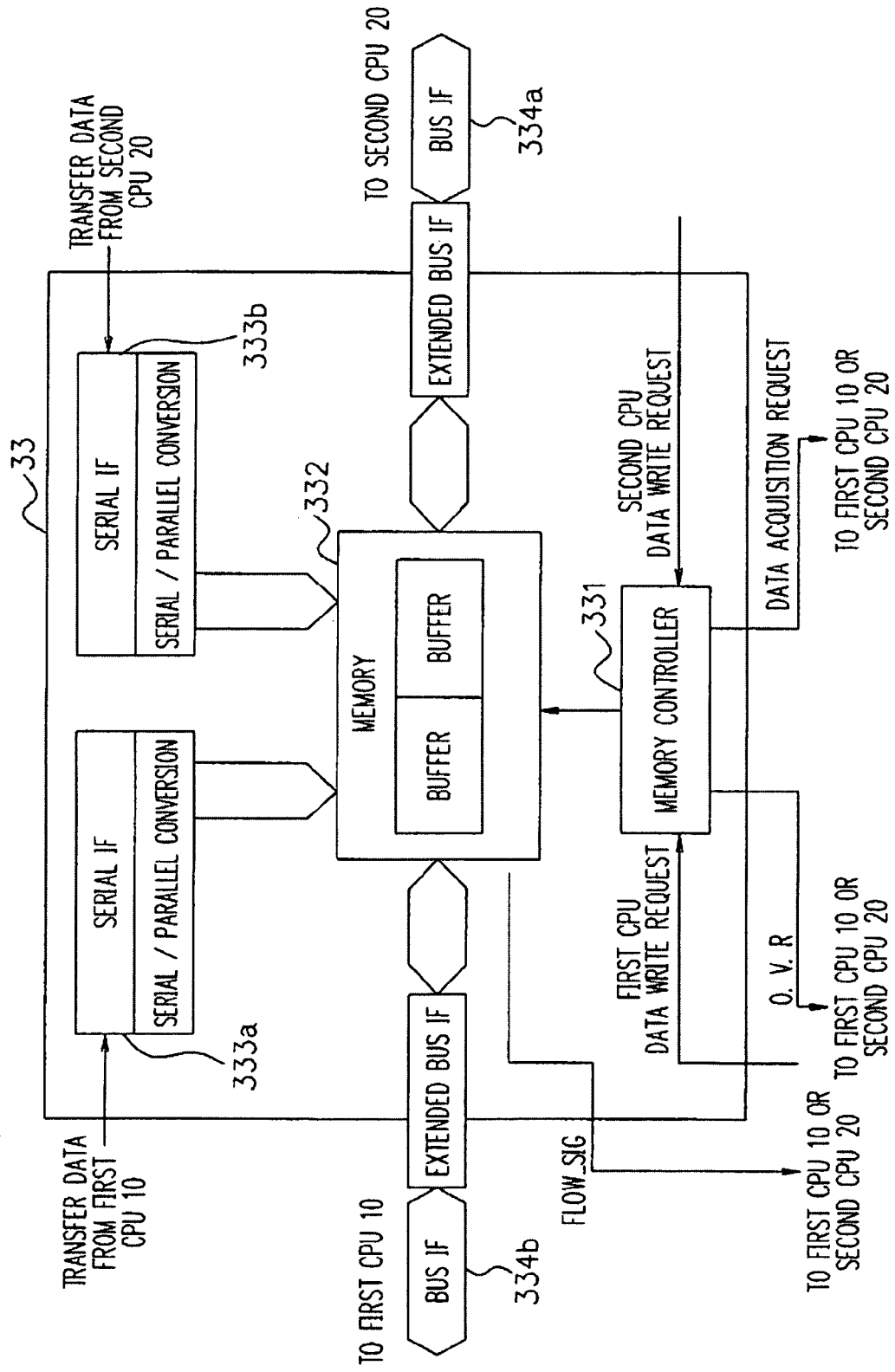
FIG. 12 is a diagram showing a configuration of a buffering IC of the data processing apparatus according to the fifth exemplary embodiment.
Figure 13:
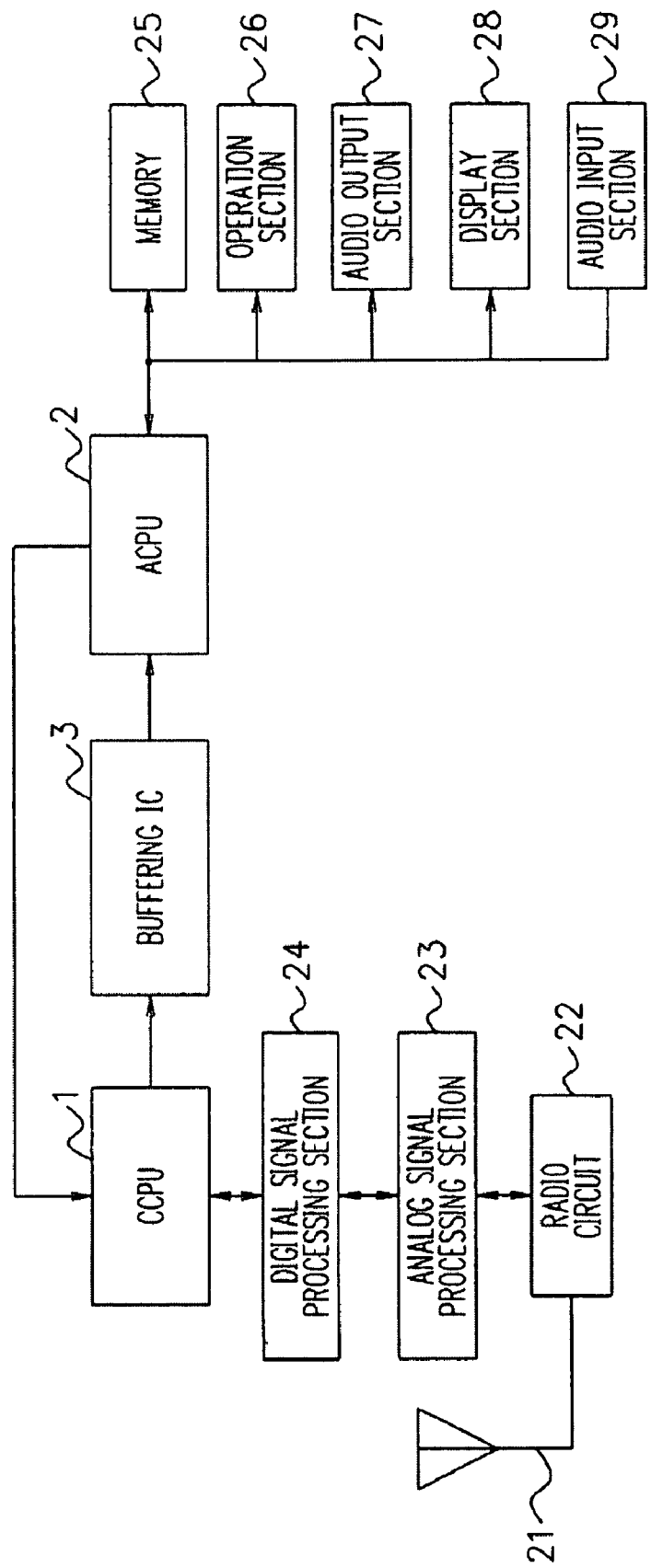
FIG. 13 is a diagram showing a configuration of a portable telephone terminal according to a sixth exemplary embodiment to which the present invention is suitably applied.

1 Communication CPU
2, 201 Application CPU
3, 31, 32, 33 Buffering IC
10 First CPU
20 Second CPU
21 Antenna
22 Radio circuit
23 Analog signal processing section
24 Digital signal processing section
25, 322*a*, 322*b* Memory
26 Operation module
27 Audio output section
28 Display section
29 Audio input section
30 Buffering section
301, 302, 312, 313 Buffer
303, 311, 321, 331 Memory controller
323*a*, 323*b*, 333*a*, 333*b* Serial IF
324*a*, 324*b*, 334*a*, 334*b* Bus IF

The invention claimed is:

1. A CPU connection circuit comprising two buffers, the circuit being connected between two CPUs for relaying data transfer from at least one of the CPUs to the other one thereof, the CPU connection circuit comprising:

a monitoring unit which monitors whether or not an amount of data stored by a transmission-side CPU in either one of the buffers reaches a predetermined threshold value; and a requesting unit which, when the amount of data stored by the transmission-side CPU in the buffer reaches the threshold value, (a) requests a reception-side CPU to acquire the data stored in the buffer, and (b) changes the data storage destination of the transmission-side CPU to the other one of the buffers, the threshold value being a value more than a unit quantity of data which the transmission-side CPU sends to the buffer, wherein when the transmission-side CPU changes the buffer as the data storage destination, if there remains, in the buffer after the change, data which are previously stored and which are not acquired by the reception-side CPU, an overrun signal is outputted to at least the reception-side CPU.

2. The CPU connection circuit in accordance with claim 1, wherein the buffer is connected via a serial transmission path to the transmission-side CPU.

3. The CPU connection circuit in accordance with claim 1, wherein the buffer is connected via a parallel transmission path to the reception-side CPU.

4. The CPU connection circuit in accordance with claim 1, further comprising two more buffers for each data transmission direction, wherein, for each data transmission, the CPU connection circuit
sets the threshold value;
monitors whether or not the amount of data reaches the threshold value;
requests the reception-side CPU to acquire the data; and
changes the data storage destination of the transmission-side CPU.

5. The CPU connection circuit in accordance with claim 1, wherein
the CPU connection circuit relays data transfer of both directions of the two CPUs; and
when both of the two CPUs desire to transfer data to the buffer, priority levels are beforehand set to determine which one of the CPUs is on the transmission-side.

6. The CPU connection circuit in accordance with claim 1, further comprising a setting unit which dynamically sets the threshold value according to a control signal inputted from the reception-side CPU.

7. The CPU connection circuit in accordance with claim 1, wherein a rate at which the reception-side CPU acquires data from the buffer is more than a data transfer rate from the transmission-side CPU to the buffer.

8. The CPU connection circuit in accordance with claim 1, wherein the data which the transmission-side CPU sends to the buffer is packet data.

9. A portable communication terminal, comprising two CPUs including a communication CPU and an application CPU, wherein the CPU connection circuit in accordance with claim 1 is disposed on a data transmission path from the communication CPU to the application CPU.

10. A data processing apparatus for processing data by transferring the data from a transmission-side CPU to a reception-side CPU comprising two buffers, the data processing apparatus comprising:
a monitoring unit which monitors whether or not an amount of data stored by a transmission-side CPU in either one of the buffers reaches a predetermined threshold value; and
a requesting unit which, when the amount of data stored by the transmission-side CPU in the buffer reaches the predetermined threshold value, (a) requests an arithmetic processing unit of the reception-side CPU to acquire the data stored in the buffer, and (b) changes the data storage destination of the transmission-side CPU to the other one of the buffers,
the threshold value being a value more than a unit quantity of data which the transmission-side CPU sends to the buffer,
wherein when the transmission-side CPU changes the buffer as the data storage destination, if there remains, in the buffer after the change, data which are previously stored and which are not acquired by the arithmetic processing unit, an overrun signal is outputted to at least the arithmetic processing unit.

11. The data processing apparatus in accordance with claim 10, wherein the buffer is connected via a serial transmission path to the transmission-side CPU.

12. The data processing apparatus in accordance with claim 10, wherein the buffer is connected via a parallel transmission path to the arithmetic processing unit.

13. The data processing in accordance with claim 10, further comprising a setting unit which dynamically sets the threshold value according to a control signal outputted from the arithmetic processing unit.

14. The data processing apparatus in accordance with claim 10, wherein a rate at which the arithmetic processing unit of the reception-side CPU acquires data from the buffer is more than a data transfer rate from the transmission-side CPU to the buffer.

15. The data processing apparatus in accordance with claim 10, wherein the data which the transmission-side CPU sends to the buffer is packet data.

16. A portable communication terminal, comprising two CPUs including a communication CPU and an application CPU, the portable communication terminal configuring the data processing apparatus in accordance with claim 10 in which the communication CPU is the transmission-side CPU and the application CPU is the reception-side CPU.

17. An arithmetic processing device, comprising:
two buffers connected via a data transmission path to a second CPU;
a monitoring unit which monitors whether or not an amount of data transferred and stored by the second CPU in either one of the buffers reaches a predetermined threshold value; and
a requesting unit which, when the amount of data stored by the second CPU in the buffer reaches the threshold value, (a) requests an arithmetic processing unit to acquire the data stored in the buffer, and (b) changes the data storage destination of the second CPU to the other one of the buffers,
the threshold value being a value more than a unit quantity of data which the second CPU sends to the buffer,
wherein when changing the buffer as the data storage destination of the data transferred from the second CPU, if there remains, in the buffer after the change, data which are previously stored and which are not acquired by the arithmetic processing unit, an overrun signal is outputted to the arithmetic processing unit.

18. The arithmetic processing device in accordance with claim 17, further comprising a setting unit which dynamically sets the threshold value according to a control signal from the arithmetic processing unit.

19. The arithmetic processing device in accordance with claim 17, wherein a rate at which the arithmetic processing unit acquires data from the buffer is more than a data transfer rate from the second CPU to the buffer.

20. The arithmetic processing device in accordance with claim 17 wherein the data stored by the second CPU in the buffer is packet data.

21. A portable communication terminal, comprising two CPUs including a communication CPU and an application CPU, wherein the arithmetic processing device in accordance with claim 17 is applied as the application processing CPU.

22. A data transfer method using a CPU connection circuit comprising two buffers and being connected between two CPUs, the data transfer method comprising:
setting in the buffer, as a threshold value of an amount of stored data, a value more than a unit quantity of data which a transmission-side CPU sends to the buffer;
monitoring whether or not an amount of data stored by a transmission-side CPU in either one of the buffers reaches the threshold value; and
when the amount of data stored by the transmission-side CPU reaches the threshold value, (a) requesting a reception-side CPU to acquire the data, and (b) changing the data storage destination of the transmission-side CPU to the other one of the buffers, wherein when the transmission-side CPU changes the buffer as the data storage destination, if there remains, in the buffer after the change, data which are previously stored and which are not acquired by the reception-side CPU, an overrun signal is outputted to at least the reception-side CPU.

23. The data transfer method in accordance with claim 22, wherein, using a CPU connection circuit comprising two buffers for each data transmission direction, the circuit being connected between two CPUs, the data transfer method comprising, for each data transmission, setting the threshold value;
monitoring whether or not the amount of data reaches the threshold value;
requesting the reception-side CPU to acquire the data; and
changing the data storage destination of the transmission-side CPU.

24. The data transfer method in accordance with claim 22, wherein the data transfer method comprising beforehand setting, when both of the two CPUs desire to transfer data to the buffer, priority levels to determine which one of the CPUs is on an transmission-side.

25. The data transfer method in accordance with claim 22, comprising dynamically setting the threshold value according to a control signal inputted from the downstream-side CPU.

26. The data transfer method in accordance with claim 22, wherein the two CPUs are connected such that a rate at which the reception-side CPU acquires data from the buffer is more than a data transfer rate from the upstream-side CPU to the buffer.

27. A data transfer method, comprising:
connecting a reception-side CPU comprising two buffers and an arithmetic processing unit to a transmission-side CPU;
setting in the buffer, as a threshold value of an amount of stored data, a value more than a unit quantity of data which the transmission-side CPU sends to the buffer;
monitoring whether or not an amount of data stored by a transmission-side CPU in either one of the buffers reaches the threshold value; and
when the amount of data stored by the transmission-side CPU reaches the threshold value, (a) requesting the arithmetic processing unit to acquire the data, and (b) changing the data storage destination of the transmission-side CPU to the other one of the buffers,
wherein when changing the buffer as the storage destination of data transferred from the transmission-side CPU, if there remains, in the buffer after the change, data which are previously stored and which are not acquired by the arithmetic processing unit, an overrun signal is outputted to the arithmetic processing unit.

28. The data transfer method in accordance with claim 27, wherein the threshold value is dynamically set according to a control signal outputted from the arithmetic processing unit.

29. The data transfer method in accordance with claim 27, wherein the reception-side CPU is connected to the transmission-side CPU such that a rate at which the arithmetic processing unit acquires data from the buffer is more than a data transfer rate from the transmission-side CPU to the buffer.

30. The data transfer method in accordance with claim 27, wherein the transmission-side CPU sends packet data to the buffer.

31. A CPU connection circuit comprising two buffers, the circuit being connected between two CPUs for relaying data transfer from at least one of the CPUs to the other one thereof, the CPU connection circuit comprising:
means for monitoring whether or not an amount of data stored by a transmission-side CPU in either one of the buffers reaches a predetermined threshold value; and
means for requesting, when the amount of data stored by the transmission-side CPU in the buffer reaches the threshold value, a reception-side CPU to acquire the data stored in the buffer, and means for changing the data storage destination of the transmission-side CPU to the other one of the buffers,
the threshold value being a value more than a unit quantity of data which the transmission-side CPU sends to the buffer,
wherein when the transmission-side CPU changes the buffer as the data storage destination, if there remains, in the buffer after the change, data which are previously stored and which are not acquired by the reception-side CPU, an overrun signal is outputted to at least the reception-side CPU.

32. A data processing apparatus for processing data by transferring the data from a transmission-side CPU to a reception-side CPU comprising two buffers, the data processing apparatus comprising:
means for monitoring whether or not an amount of data stored by a transmission-side CPU in either one of the buffers reaches a predetermined threshold value; and
means for requesting, when the amount of data stored by the transmission-side CPU in the buffer reaches the predetermined threshold value, arithmetic processing means of the reception-side CPU to acquire the data stored in the buffer, and means for changing the data storage destination of the transmission-side CPU to the other one of the buffers,
the threshold value being a value more than a unit quantity of data which the transmission-side CPU sends to the buffer,
wherein when the transmission-side CPU changes the buffer as the data storage destination, if there remains, in the buffer after the change, data which are previously stored and which are not acquired by the reception-side CPU, an overrun signal is outputted to at least the reception-side CPU.

33. An arithmetic processing device, comprising:
two buffers connected via a data transmission path to a second CPU;
means for monitoring whether or not an amount of data transferred and stored by the second CPU in either one of the buffers reaches a predetermined threshold value; and
means for requesting, when the amount of data stored by the second CPU in the buffer reaches the threshold value, arithmetic processing means to acquire the data stored in the buffer, and means for changing the data storage destination of the second CPU to the other one of the buffers,
the threshold value being a value more than a unit quantity of data which the second CPU sends to the buffer,
wherein when the transmission-side CPU changes the buffer as the data storage destination, if there remains, in the buffer after the change, data which are previously stored and which are not acquired by the reception-side CPU, an overrun signal is outputted to at least the reception-side CPU.

* * * * *